US011375295B2

(12) United States Patent
Geng et al.

(10) Patent No.: US 11,375,295 B2
(45) Date of Patent: Jun. 28, 2022

(54) METHOD AND DEVICE FOR OBTAINING VIDEO CLIP, SERVER, AND STORAGE MEDIUM

(71) Applicant: BEIJING DAJIA INTERNET INFORMATION TECHNOLOGY CO., LTD., Beijing (CN)

(72) Inventors: Zhenjian Geng, Beijing (CN); Yang Zhang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/257,447

(22) PCT Filed: Oct. 25, 2019

(86) PCT No.: PCT/CN2019/113321
§ 371 (c)(1),
(2) Date: Dec. 31, 2020

(87) PCT Pub. No.: WO2020/093883
PCT Pub. Date: May 14, 2020

(65) Prior Publication Data
US 2021/0258658 A1 Aug. 19, 2021

(30) Foreign Application Priority Data
Nov. 9, 2018 (CN) .......................... 201811334212.8

(51) Int. Cl.
*H04N 21/845* (2011.01)
*H04N 21/2187* (2011.01)
(Continued)

(52) U.S. Cl.
CPC ..... *H04N 21/8456* (2013.01); *H04N 21/2187* (2013.01); *H04N 21/233* (2013.01);
(Continued)

(58) Field of Classification Search
CPC .......... H04N 21/8456; H04N 21/2187; H04N 21/233; H04N 21/23418; H04N 21/47217;
(Continued)

(56) References Cited

U.S. PATENT DOCUMENTS 9,848,228 B1 *  12/2017  Morris ................. H04N 5/9265
2003/0014135 A1 *  1/2003  Moulios .................... G10H 1/40
                                                            700/94
(Continued)

FOREIGN PATENT DOCUMENTS

CN          103871426 A       6/2014
CN          103999453 A       8/2014
(Continued)

OTHER PUBLICATIONS

Chinese Office Action dated Dec. 31, 2019, from application No. 201811334212.8.
(Continued)

*Primary Examiner* — Nasser M Goodarzi
*Assistant Examiner* — Adil Ocak
(74) *Attorney, Agent, or Firm* — Foley & Lardner LLP

(57) ABSTRACT

The present application belongs to the technical field of audio and video, and relates to a method and device for obtaining a video clip, a server, and a storage medium. The method includes in response to obtaining a clip in live stream video data of a performance live stream room, using audio data from the live stream video data and audio data of an original performer to determine a target timepoint parameter of the live stream video data. The method includes obtaining a target video clip according to a start timepoint and an end timepoint in the target timepoint parameter. The present application is used to capture a more complete video clip.

18 Claims, 3 Drawing Sheets

(51) Int. Cl.
  *H04N 21/233* (2011.01)
  *H04N 21/234* (2011.01)
  *H04N 21/472* (2011.01)
  *H04N 21/858* (2011.01)

(52) U.S. Cl.
  CPC . *H04N 21/23418* (2013.01); *H04N 21/47217* (2013.01); *H04N 21/858* (2013.01)

(58) Field of Classification Search
  CPC ............ H04N 21/858; H04N 21/4394; H04N 21/8113; H04N 21/4334; H04N 21/47202
  See application file for complete search history.

(56) References Cited

U.S. PATENT DOCUMENTS

| | | | |
|---|---|---|---|
| 2005/0267750 A1 | 12/2005 | Steuer et al. | |
| 2009/0064249 A1* | 3/2009 | Haynes | H04N 21/2347 725/109 |
| 2015/0242368 A1 | 8/2015 | Hagg | |
| 2016/0275084 A1 | 9/2016 | Pereira et al. | |
| 2017/0092328 A1* | 3/2017 | Anderson | H04N 5/93 |
| 2019/0320211 A1* | 10/2019 | Chen | H04N 21/234309 |

FOREIGN PATENT DOCUMENTS

| | | |
|---|---|---|
| CN | 105939494 A | 9/2016 |
| CN | 106658033 A | 5/2017 |
| CN | 106782600 A | 5/2017 |
| CN | 106804000 A | 6/2017 |
| CN | 107018427 A | 8/2017 |
| CN | 107507628 A | 12/2017 |
| CN | 108540854 A | 9/2018 |
| CN | 108600778 A | 9/2018 |
| CN | 108683927 A | 10/2018 |
| CN | 109218746 A | 1/2019 |
| WO | WO-2020/093883 A1 | 5/2020 |

OTHER PUBLICATIONS

International Search Report dated Dec. 31, 2019, from application No. PCT/CN2019/113321.

* cited by examiner

METHOD AND DEVICE FOR OBTAINING VIDEO CLIP, SERVER, AND STORAGE MEDIUM

CROSS-REFERENCE TO RELATED APPLICATIONS

The present application is the 371 application of PCT Application No. PCT/CN2019/113321, filed on Oct. 25, 2019, which claims the priority to Chinese Patent Application No. 201811334212.8, filed with China National Intellectual Property Administration on Nov. 9, 2018, and entitled "METHOD AND DEVICE FOR OBTAINING VIDEO CLIP, SERVER, AND STORAGE MEDIUM", the disclosures of which are incorporated herein by reference in their entireties.

TECHNICAL FIELD

The present application relates to the field of audio and video technologies, and in particular to a method and device for obtaining a video clip, a server, and a storage medium.

BACKGROUND

With development of computer technologies and network technologies, there are more and more live streaming applications. A person can log in to the live streaming application to watch a live streaming program of a host in a live streaming room of interest. While the person watches the live streaming program, he/she can record video clips with wonderful content as finding the wonderful content, and then store the recorded video clips in a terminal used by the person or share the recorded video clips with other friends.

A recording button is provided in a live streaming interface. After detecting an operation instruction indicating that the recording button is operated, the terminal can use a screen recording function provided by an operation system of the terminal to start recording video data displayed on a screen. After detecting the operation instruction indicating that the recording button is operated again, the terminal ends the recording of the video data displayed on the screen. In this way, the video clips with wonderful content can be obtained by recording.

In process of implementing the present application, the inventor found that the related art has at least the following problems.

People start to operate the recording button after they saw the wonderful content, and the terminal starts to record the video data displayed on the screen after detecting the operation instruction indicating that the recording button is operated. As a result, there is a time interval between a time when people saw the wonderful content and a time when the terminal starts to record the video data displayed on the screen, and the wonderful content during this time interval cannot be recorded, which causes the video clips of the wonderful content incomplete.

SUMMARY

Implementations of the present application provide a method and device for obtaining a video clip, a server and a storage medium.

According to a first aspect of the implementations of the present application, there is provided a method for obtaining a video clip. The method includes obtaining live streaming video data in a performance live streaming room. The method includes determining target time point pairs of the live streaming video data based on audio data of the live streaming video data and audio data of an original performer. Each of the target time point pairs includes a start time point and an end time point. The method includes obtaining a target video clip from the live streaming video data based on the target time point pairs.

According to a second aspect of the implementations of the present application, there is provided a device for obtaining a video clip. The device includes an obtaining unit configured to obtain live streaming video data in a performance live streaming room. The device includes a determining unit configured to determine target time point pairs of the live streaming video data based on audio data of the live streaming video data and audio data of an original performer. Each of the target time point pairs includes a start time point and an end time point. The obtaining unit is further configured to obtain a target video clip from the live streaming video data based on the target time point pairs.

According to a third aspect of the implementations of the present application, there is provided a server. The server includes a processor and a memory for storing instructions executable by the processor. The processor is configured to perform a method for obtaining a video clip. The method includes obtaining live streaming video data in a performance live streaming room. The method includes determining target time point pairs of the live streaming video data based on audio data of the live streaming video data and audio data of an original performer. Each of the target time point pairs includes a start time point and an end time point. The method includes obtaining a target video clip from the live streaming video data based on the target time point pairs.

According to a fourth aspect of the implementations of the present application, there is provided a non-transitory computer-readable storage medium having stored therein instructions which, when being executed by a processor of a server, cause the server to perform a method for obtaining a video clip. The method includes obtaining live streaming video data in a performance live streaming room. The method includes determining target time point pairs of the live streaming video data based on audio data of the live streaming video data and audio data of an original performer. Each of the target time point pair includes a start time point and an end time point. The method includes obtaining a target video clip from the live streaming video data based on the target time point pairs.

According to a fifth aspect of the implementations of the present application, there is provided an application program, including one or more instructions which can be executed by a processor of a server to carry out a method for obtaining a video clip. The method includes obtaining live streaming video data in a performance live streaming room. The method includes determining target time point pairs of the live streaming video data based on audio data of the live streaming video data and audio data of an original performer. Each of the target time point pairs includes a start time point and an end time point. The method includes obtaining a target video clip from the live streaming video data based on the target time point pairs.

BRIEF DESCRIPTION OF THE DRAWINGS

In order to explain technical solutions in implementations of the present application more clearly, drawings to be used in the implementations are briefly introduced below. It is apparent that the drawings in the following description show only some of the implementations of the present disclosure, and other drawings may be obtained by those skilled in the art without departing from the drawings described herein.

DETAILED DESCRIPTION

In order to make the purposes, technical solutions, and advantages of the present application more clear, the present application is described below in detail with reference to the drawings and by way of implementations. Obviously, the implementations described here are only a part of the implementations of the present application, rather than all the implementations. Based on the implementations in the present application, all other implementations which can be obtained by those of ordinary skill in the art without creative work fall within the protection scope of the present application.

The implementations of the present application provide a method for obtaining a video clip, which can be performed by a server. The server may be a background server of a live steam application, or a Content Delivery Network (CDN) server. The server can be provided with a processor, a memory, a transceiver, etc. The processor can be configured to perform process such as obtaining and distributing the video clip, and the memory can be configured to store data required or generated in the process of obtaining the video clip, such as video data of the video clip, live streaming video data, and so on. The transceiver can be configured to receive and transmit data which can be the live streaming video data, comment information, link information of the video clip, etc.

Before explaining a solution for obtaining a video clip provided by the implementations of the present application, application scenarios of the implementations of the present application are introduced first.

For the convenience of description, a terminal used by a host is referred to as a user terminal, and the background server of the live streaming application is referred to as a server. The above-mentioned live streaming application is installed in the user terminal.

After the host controls to start live streaming of a performance live streaming room by the live streaming application installed in the user terminal, the user terminal obtains the live streaming video data of the host and sends the live streaming video data to the server. In response to receiving the live streaming video data sent by the user terminal, the server can obtain a target video clip from the received live streaming video data.

Alternatively, after the host controls to start the live streaming of the performance live streaming room by the live streaming application installed in the user terminal, the user terminal obtains the live streaming video data of the host and sends the live streaming video data to the server. In response to receiving the live streaming video data, the server stores the received live streaming video data, and can obtain the target video clip from the stored live streaming video data after the live streaming in the performance live streaming room ends.

Figure 1:
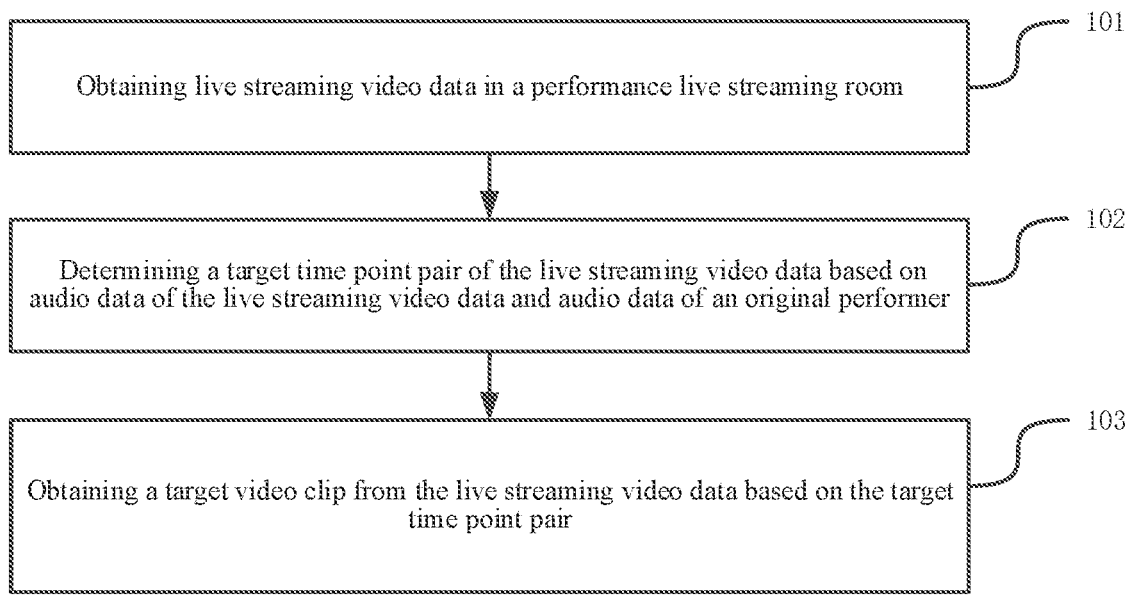
FIG. 1 is a flowchart showing a method for obtaining a video clip according to an example implementation.

The implementations of the present application provide a method for obtaining a video clip. As shown in FIG. 1, an execution flow of the method can include the following operations.

In 101, obtaining live streaming video data in a performance live streaming room.

The sever can obtain the live streaming video data in the performance live streaming room. The performance live streaming room refers to a live streaming room where music performance is performed when the live streaming is started. For example, the performance live streaming room is a live streaming room for singing songs, a live streaming room for playing musical instruments, or the like.

In an implementation of the present application, after the host controls to start the live streaming of the performance live streaming room by the live streaming application installed in the user terminal, the server can receive the live streaming video data sent by the user terminal, and save the received live streaming video data. In addition, the server may also determine other accounts than a host account among accounts logged into the performance live streaming room, and then send the received live streaming video data to terminals used by the other accounts. For ease of presentation, the terminals used by other accounts are referred to as login terminals. In addition, each of the login terminals is also installed with the live streaming application. After receiving the live streaming video data, each of the login terminals can play the received live streaming video data on a live streaming interface of the performance live streaming room by logging into the live streaming application installed in the login terminal.

In an implementation of the present application, the live streaming video data includes audio data having sound information and video data having picture information. The live streaming video data can also be understood as multimedia data.

In 102, determining a target time point pair (or otherwise time point parameter) of the live streaming video data based on audio data of the live streaming video data and audio data of an original performer.

The server can determine the target time point pair of the live streaming video data based on the audio data of the live streaming video data and the audio data of the original performer. Since the live streaming video data is associated with the live streaming time, this operation can be understood as determining the target time point pair of the live streaming video data.

The audio data of the original performer may be the audio data of a song sung by the original singer, or the audio data of performance by the original performer using a musical instrument. The target time point pair includes one or more time point pairs each of which includes a set of time points, that is, a start time point and an end time point.

Specifically, the start time point and the end time point included in the target time point pair may be a time point indicating a start of the wonderful content of the live streaming video and a time point indicating an end of the wonderful content of the live streaming video.

In an implementation of the present application, if the video data and audio data in the live streaming video data are separated, after obtaining the live streaming video data, the server can directly obtain the audio data of the original performer based on the audio data in the live streaming video data. If the video data and the audio data in the live streaming video data are mixed, after obtaining the live streaming video data, the server can separate the video data and audio data in the live streaming video data to obtain the audio data in the live streaming video data, and then obtain the audio data of the original performer based on the audio data in the live streaming video data.

In an implementation of the present application, after obtaining the live streaming video data in the performance live streaming room, the server can obtain streaming introduction information of the live streaming in the live streaming room, which includes content of the live streaming by the host. The server can obtain the audio data of the original performer based on the content of the live streaming by the host.

Specifically, the server may perform similarity matching between the audio data in the live streaming video data and the audio data of the original performer, and determine the target time point pair in the live streaming video data based on a similarity matching result.

In an implementation of the present application, a time point may be determined first, and then the target time point pair is determined based on this time point. Accordingly, a processing of the 102 can include:

determining a first time point in the live streaming video data based on the audio data from the live streaming video data and the audio data of the original performer, and determining the target time point pair corresponding to the first time point centered at the first time point based on a preset interception time duration.

The preset interception time duration can be set in advance and stored in the server, and can be, for example, 10 seconds.

In an implementation of the present application, the server can determine the first time point by using the audio data in the live streaming video data and the audio data of the original performer, obtain the preset interception time duration stored in advance, and obtain the start time point corresponding to the first time point by determining a time point preceding the first time point by a half of the preset interception time duration, and the end time point corresponding to the first time point by determining a time point after the first time point by a half of the preset interception duration. As such, the start time point and the end time point can form the target time point pair corresponding to the first time point.

For example, it is assumed that the first time point is at the 20th second and the preset interception time duration is 10 seconds, a half of the preset interception duration is 5 seconds, and the start time point corresponding to the first time point is at the (20−5)th second=the 15th second, and the end time point corresponding to the first time point is at the (20+5)th second=the 25th second, and thus the time points at the 15th second and the 25th second form the target time point pair corresponding to the first time point.

Specifically, the first time point can be the time point that characterizes the wonderful content of the live streaming, and the start time point and the end time point in the target time point pair corresponding to the first time point can be the time point that characterizes the start of the wonderful content and the time point that characterizes the end of the wonderful content.

In an implementation of the present application, in response to determining that the audio data in the live streaming video data is the audio data of a song sung by the host, and the audio data of the original performer is the audio data of the song sung by the original singer, the method for determining the first time point can include:

performing voice recognition on the audio data in the live streaming video data to obtain lyrics of the song; obtaining the audio data of the song sung by the original singer based on the obtained lyrics; determining a similarity between audio features of the audio data of the song sung by the original singer and audio features of the audio data in the live streaming video data for each sentence of the lyrics to obtain a lyric similarity of each sentence of the lyrics; and determining a time point in the audio data of live streaming video data corresponding to a position in the lyrics with a highest lyric similarity among the lyrics whose similarities are above a first preset threshold, as the first time point in the live streaming video data.

The first preset threshold can be set in advance and stored in the server, and can be, for example, 90%.

In an implementation of the present application, the server may use a voice recognition algorithm stored in advance to perform the voice recognition on the audio data in the live streaming video data to obtain the lyrics of the song sung by the host. A query can be performed by using the obtained lyrics in a preset lyric database which includes the lyrics and the audio data of the original singer of the song corresponding to the lyrics to determine the audio data of the original singer of the song corresponding to the obtained lyrics. For each sentence of the lyrics, the server can determine the audio data of the song sung by the original singer and the audio data of the song sung by the host. Based on an audio feature extraction algorithm, the server performs the audio feature extraction on the audio data of the song sung by the original singer and the audio data of the song sung by the host respectively to determine the similarity between the audio features of the song sung by the original singer and the audio features of the song sung by the host with respect to the sentence of lyrics. Then the server determines a relationship between the similarity and the first preset threshold in magnitude. If the similarity is greater than the first preset threshold, the server determines a position with the highest similarity in the sentence of lyrics and the live streaming time point of the audio data in the live streaming video data corresponding to the position with the highest similarity, and determines this time point as the first time point of the live streaming video data. If the similarity is less than or equal to the first preset threshold, the process of determining the first time point is not performed. In this way, the above processing can be performed for each sentence of lyrics to determine the first time point of the live streaming video data.

In this way, for a sentence of lyrics, if the similarity between the audio features of the audio data in the live streaming video data and the audio features of the audio data of the original singer is higher than the first preset threshold, the position in the lyrics with the highest similarity is further selected, which indicates that the lyrics in this position are sung better by the host. The audio data in the live streaming video data corresponding to the position of the lyrics is determined, and the time point for playing the determined audio data is determined as the first time point, which indicates that the similarity between the audio data of the live streaming at the first time point by the host and the audio data of the original singer is highest, and also indicates that the host sings better at the first time point which can be determined as a wonderful moment.

Specifically, the voice recognition algorithm can include any voice recognition algorithm, such as a Fast Endpoint Detection (FED) algorithm or the like.

In addition, in response to determining that the audio data in the live streaming video data is the audio data of playing a musical instrument, the server can identify the audio data in the live streaming video data to determine a name of a work played by the host, and then search for the audio data of an original performer playing the musical instrument based on the name of the work. The server performs the alignment process on the audio data in the live streaming video data and the audio data of the original performer playing the musical instrument, and performs segmentation process on the two pieces of audio data after the alignment process. For example, each of the two pieces of audio data are segmented into pieces of audio data of 5 seconds, which are sequentially numbered as a1, a2, a3, . . . , ai, . . . , an for the audio data in the live streaming video data, and sequentially numbered as b1, b2, b3, . . . , bi, . . . , bn for the audio data of the original performer playing the musical instrument. Then the server can extract the audio features of a1 and the audio features of b1, respectively, and calculate the similarity between the extracted audio features of a1 and b1. If the similarity is greater than the first preset threshold, the position in a1 with the highest similarity to b1 is determined, and the live streaming time point corresponding to the position with the highest similarity is obtained and determined as the first time point. By analogy, the first time points for the audio data such as a2 and a3 subsequent to a1 can be determined.

In addition, in response to determining that the audio data in the above live streaming video data is the audio data of the sung song, the first time point can also be obtained in the manner of the segmentation processing.

The audio features may be fundamental audio features, pitch audio features, and so on. The audio feature extraction algorithm may be an algorithm in the prior art, for example, an algorithm for extracting the fundamental audio features in the existing music scoring system. A specific process for extracting the audio features includes: pre-emphasis, framing, windowing, obtaining short-term average energy, and deriving autocorrelation. The fundamental audio features can be obtained through such process, and primary parameters involved in this process include a high-frequency boosting parameter, a frame length, a frame shift, and unvoiced and voiced thresholds.

In 103, obtaining a target video clip from the live streaming video data based on the target time point pair.

The server can obtain the target video clip from the live streaming video data based on the target time point pair. The target video clip refers to a video clip in the live streaming video data that includes first audio data, and the first audio data is audio data in the audio data of the live streaming video data with a similarity with the audio data of an original performer meeting a certain condition.

Specifically, the target video clip can be a video clip between the start time point and the end time point included in the target time point pair in the live streaming video data.

In an implementation of the present application, after determining the target time point pair, the server can find a time stamp corresponding to the start time point of the target time point pair and a time stamp of the end time point in the target time point pair based on time stamps of the live streaming video data, and can intercept the video clip between these two time stamps as the target video clip.

In an implementation of the present application, after the target video clip is obtained, the target video clip may also be provided to the audiences in the performance live streaming room. The corresponding processing can include:

generating link information of the target video clip, and sending the link information to login terminals of other accounts than the host account in the performance live streaming room to enable the login terminals of the other accounts to display the link information on a playback interface of the performance live streaming room, or to display the link information on a live streaming end interface of the performance live streaming room.

Since the host account logs in to the live streaming room during the live streaming, and the accounts of the audiences watching the live streaming will also log in to the live streaming room, after the link information of the target video clip is generated, the link information is sent to the login terminals of other accounts than the host account in the performance live streaming room. Since the login terminals of the other accounts are all installed with the live streaming application, the login terminals of the other accounts can display the link information on the playback interface of the performance live streaming room by the installed live streaming application, or display the link information on the live streaming end interface of the performance live streaming room.

The playback interface is an interface for displaying a playing link for the playback of the live streaming video data, and the live streaming end interface refers to an interface displayed when the live streaming ends in the live streaming room.

In an implementation of the present application, after obtaining the target video clip, the server can randomly obtain a picture from the data of the target video clip as a cover of the target video clip, and add a name to the target video clip, for example, a name of the song sung by the host can be used as the name of the target video clip, and then generate the link information based on the cover, the name, and the data storage address of the target video clip. The link information can be a Uniform Resource Locator (URL).

Figure 2:
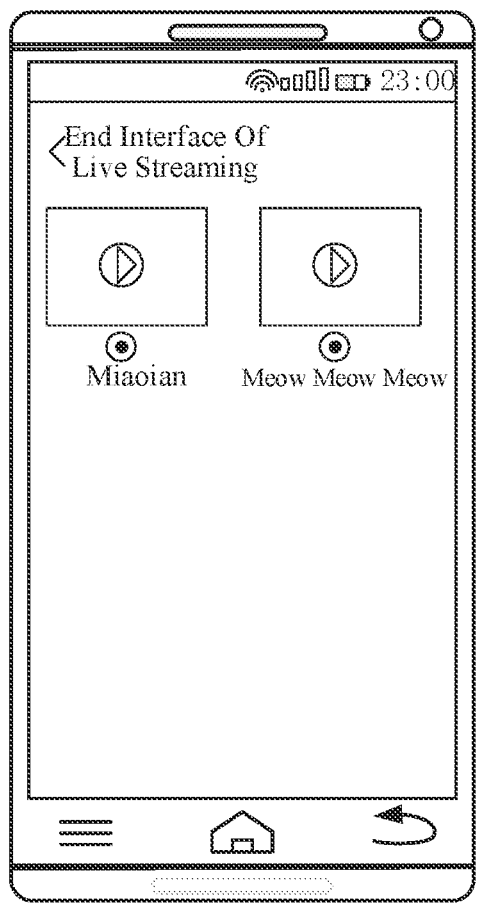
FIG. 2 is a schematic diagram showing display of link information of a video clip according to an example implementation.

The server can determine the accounts other than the host account among the accounts logged into the performance live streaming room, and send the link information of the target video clip to the login terminals of the other accounts. After receiving the link information, the login terminals of the other accounts can display the link information of the target video clip on the playback interface of the performance live streaming room by the installed live streaming application, or can display the link information of the target video clip on the live streaming end interface. For example, as shown in FIG. 2, the server obtains the link information of two video clips, one is the link information of "Miaoian" and the other is the link information of "Meow Meow Meow". The login terminals of the other accounts can display the link information of two video clips on the live streaming end interface. Specifically, the link information shown in FIG. 2 includes two video playback links.

If the audience in the performance live streaming room wants to share certain link information, he/she can select the link information and then click a corresponding sharing option. The terminal used by the audience will display various regional options for sharing, such as regional options for sharing in a certain application or the current live streaming application, after detecting a click instruction on the sharing option. The audience can select the corresponding regional option and then confirm the option by a click operation. The terminal used by the audience will display an edit box in response to detecting the click operation for determining the option. In this case, the edit box will display preset content, such as "come and watch a song B sung by a host A", etc. The audience can directly share the content displayed in the edit box as it is, or re-edit the content displayed in the edit box, and then share it to the region corresponding to the selected regional option. As such, the sharing process is completed.

In an implementation of the present application, a process of screening the first time points is also provided, and the corresponding processing can include:

determining a second time point in the live streaming video data based on interaction information of accounts other than a host account of the live streaming video data; if a target time point in the first time points belongs to the second time point, retaining the target time point, and if the target time point in the first time points does not belong to the second time point, deleting the target time point; and determining the target time point pair corresponding to the retained first time point centered at the retained first time point based on the preset interception time duration.

The interaction information may include one or more of comment information, like information, and gift information.

The target time point may be any time point in the first time points. That is, each time point in the first time points is used as the target time point, and it is determined whether the target time point belongs to the second time points, so as to determine whether to retain the target time point or delete the target time point.

In an implementation of the present application, after the live streaming in the performance live streaming room starts, the server can store the received comment information, like information and gift information, and determine the second time point in the live streaming video data by using one or more of the comment information, like information and gift information.

It is determined whether the target time point in the first time points belongs to the second time point, if the target time point belongs to the second time point, the target time point is retained, and if the target time point does not belong to the second time point, the target time point is deleted.

Then the server can take the retained first time point as the center, obtain the start time point corresponding to the retained first time point by determining a time point preceding the retained first time point by half of the preset interception time duration, and obtains the end time point corresponding to the retained first type time point by determining a time point after the retained first time point by half of the preset interception time duration. The start time point and the end time point form the target time point pair. In this way, the first time points can be screened based on the interaction information, so that the intercepted video clips have a higher probability of including the wonderful content.

In view of the foregoing description, the second time point can be understood as time points characterized by frequent audience interaction during the live streaming.

In an implementation of the present application, there is also provided a method for determining the target time point pair by using the interaction information, and the corresponding processing can include:

determining the second time point in the live streaming video data based on interaction information of accounts other than a host account of the live streaming video data; combining the first time point and the second time point, and performing deduplication process on the combined time points; and determining the target time point pair corresponding to the time point obtained by the deduplication processing based on the preset interception time duration by taking the time point obtained by the deduplication processing as the center.

In an implementation of the present application, after the live streaming in the performance live streaming room starts, the server can store the received comment information, like information and gift information, and can determine the second time point in the live streaming video data by using one or more of the comment information, like information and gift information.

Then the first time points and the second time points are combined to obtain the combined time points, and the reduplicated time point in the combined time points is deleted, that is, the deduplication processing is performed on the time points, and the start time point corresponding to the deduplicated time point is obtained by determining a time point preceding the deduplicated time point by half of the preset interception time duration, and the end time point corresponding to the deduplicated time point is obtained by determining a time point after the deduplicated time point by half of the preset interception time duration. The start time point and the end time point form the target time point pair.

In an implementation of the present application, there are many manners to determine the second time point based on the interaction information in the live streaming video data, and several feasible ones among them are given below.

In a first manner, if an amount of gift resources of the live streaming video data in a first time period exceeds a second preset threshold, a middle time point or an end time point of the first time period is determined as the second time point in the live streaming video data.

The duration of the first time period can also be preset and stored in the server, and can be, for example, 2 seconds. The second preset threshold can also be preset and stored in the server.

In an implementation of the present application, the server may determine the first time periods in the live streaming video data based on the time stamps of the live streaming video data. The first time periods may be time periods of same duration, and the time interval between adjacent time periods may be equal. The time interval between the adjacent time periods can be determined by the start time points or the end time points of the adjacent time periods. Furthermore, there may or may not be an overlapped area between adjacent first time periods.

Figure 3:
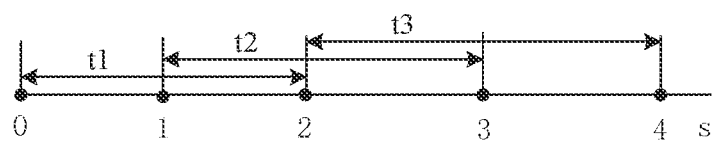
FIG. 3 is a schematic diagram showing a first time period according to an example implementation.

For example, as shown in FIG. 3, the live streaming video data is video data with a length of 30 minutes, a period from the 0th second to 2nd second is a first one of the first time periods, t1, a period from the 1st second to 3rd second is a second one of the first time periods, t2, a period from the 2nd second to 4th second is a third one of the first time periods, t3, and so on, and multiple first time periods are selected. The start time point and the end time point of each first time period are determined, and based on the start time point and end time point, the names and number of gifts carried in the received gift requests are determined during the time interval between the start time point and the end time point to count the number of the gifts in the time interval, and then the server can obtain resources for each type of the carried gifts, for example, 50 gold coins for a "yacht" gift. The amount of resources for each type of gifts is obtained by multiplying the number of each type of gifts by the corresponding resources, and then is added up to obtain the amount of the gift resources in the first time period. Then the server can determine the magnitude relationship between the amount of the gift resources in the first time period and a second preset threshold. If the amount of the gift resources in the first time period is greater than the second preset threshold, a middle time point of the first time period can be determined and used as the second time point in the live streaming video data, or an end time point of the first time period can be determined and used as the second time point in the live streaming video data.

In addition, the amount of the gift resources can also be determined based on an image recognition method, and the corresponding processing can include:

performing gift image recognition on images for the first time period in the live streaming video data to obtain the number of the images of various recognized gifts. Based on the number of images of each type of gifts, the amount of the gift resources in the first time period is determined.

In an implementation of the present application, the server may obtain the images for each first time period from the live streaming video data, and then input the images into a preset gift image recognition algorithm which may be a pre-trained algorithm, so as to identify the number of images of each type of gifts contained in the images, and to obtain the resources for each type of gifts. The number of each type of gifts is multiplied by the corresponding resources of each type of gifts to obtain the amount of resources of each type of gifts. The amount of the resources of each type of gifts is added up to obtain the amount of the gift resources in the first time period.

Since the more gift resources reflect that the content of the live streaming is more wonderful, the amount of the gift resources can be used for determining the wonderful content.

The gift image may refer to an area in the image that represents a gift.

Specifically, the gift image recognition algorithm may be a neural network algorithm obtained by training. In response to determining that an image is input to the neural network algorithm, the neural network algorithm can output the name of the gift image contained in the image, that is, the name of the gift, and the number of gift images.

In a second manner, if the amount of comment information of the live streaming video data in a second time period exceeds a third preset threshold, the middle time point or the end time point of the second time period is determined as the second time point in the live streaming video data.

The duration of the second time period can also be preset and stored in the server, and can be, for example, 2 seconds. The third preset threshold can also be preset and stored in the server.

In an implementation of the present application, the server may determine the second time periods in the live streaming video data based on the time stamps of the live streaming video data. The second time periods may be time periods of same duration, and the time interval between adjacent time periods may be equal. Furthermore, there may or may not be an overlapped area between adjacent second time periods.

For example, the live streaming video data is video data with a length of 30 minutes, a period from the 0th second to 2nd second is a first one of the second time periods, t1, a period from the 1st second to 3rd second is a second one of the second time periods, t2, a period from the 2nd second to 4th second is a third one of the second time period, t3, and so on, and thus multiple second time periods are selected. The start time point and the end time point of each second time period are determined, and based on the start time point and end time point, the amount of comment information received in the time interval between the start time point and the end time point are determined, the magnitude relationship between the amount of received comment information and the third preset threshold is determined. If the amount of received comment information is greater than the third preset threshold, the middle time point of the second time period can be determined as the second time point in the live streaming video data, or the end time point of the first time period can be determined as the second time point in the live streaming video data.

Since the more comment information received reflects that the content of the live streaming is more wonderful, the amount of comment information can be used for determining the wonderful content.

In a third manner, if the number of likes of the live streaming video data in a third time period exceeds a fourth preset threshold, the middle time point or the end time point of the third time period is determined as the second time point in the live streaming video data The duration of the third time period can also be preset and stored in the server, and can be, for example, 2 seconds. The fourth preset threshold can also be preset and stored in the server. During the live streaming, the like refers to clicking a preset mark in the live streaming interface.

In an implementation of the present application, the server may determine the third time periods in the live streaming video data based on the time stamps of the live streaming video data. The third time periods may be time periods of the same duration, and the time interval between adjacent time periods may be equal. Furthermore, there may or may not be an overlapped area between adjacent third time periods.

For example, the live streaming video data is video data with a length of 30 minutes, a period from the 0th second to 2nd second is a first one of the third time periods, t1, a period from the 1st second to 3rd second is a second one of the third time periods, t2, a period from the 2nd second to 4th second is a third one of the third time periods, t3, and so on, and thus multiple third time periods are selected. The start time point and the end time point of each third time period are determined, and based on the start time point and end time point, the number of like requests received, that is, the amount of like information received in the time interval between the start time point and the end time point is determined. The magnitude relationship between the number of the received like requests and the fourth preset threshold is determined. If the number of the received like requests is greater than the fourth preset threshold, the middle time point of the third time period can be determined as the second time point in the live streaming video data, or the end time point of the third time period can be determined as the second time point in the live streaming video data.

Since the more like information received reflects that the content of the live streaming is more wonderful, the amount of like information can be used for determining the wonderful content.

In addition, the interaction information in the above first to third manners can be used in combination to determine the second time point, and the corresponding processing can include the following.

In an implementation of the present application, the amounts of the gift resources, the comment information, and the like information each correspond to a certain weight, which is respectively A, B, and C. For a fourth time period, the amount of the gift resources determined by the server is x, the amount of the comment information determined by the server is y, and the amount of the like information determined by the server is z, and then they are weighted to obtain a weighted value: $A*x+B*y+C*z$. The magnitude relationship between the weighted value and a preset value is determined, and if the weighted value is greater than the preset value, the middle time point of the fourth time period is determined as the second type time point in the live streaming video data. In this way, the second time point is determined in comprehensive consideration of the three types of interaction information, which is more accurate.

The fourth time periods may be time periods of the same duration, and the time interval between adjacent time periods may be equal. Furthermore, there may or may not be an overlapped area between adjacent fourth time periods.

In addition, it is also possible to select two kinds of interaction information from the above first method to the third method for the weighted calculation to determine the second time point, which is carried out in the same manner as that for the case of using the interaction information of the three manners, and thus will not be repeated here.

It should be noted that the duration of the first time period, the second time period, the third time period and the fourth time period can be the same. In order to make the determined position of the wonderful content accurate, the durations of the first time period, the second time period, the third time period and the fourth time period are generally short, and can be less than 5 seconds, for example.

In addition, in order to ensure that the determined target video clips do not have duplicate content, the following processing may be performed after 102 and before 103.

In the target time point pairs, if a first start time point is earlier than a second start time point, an end time point corresponding to the first start time point is earlier than an end time corresponding to the second start time point, and the second start time point is earlier than the end time point corresponding to the first start time point, the end time point corresponding to the first start time point is replaced with the end time point corresponding to the second start time point and the second start time point and the end time point corresponding to the second start time point are deleted in the target time point pairs.

The first start time point is different from the second start time point, the first start time point is any start time point other than the second start time point in the target time point pair, and the second start time point is any start time point other than the first start time point in the target time point pair.

That is, the first start time point and the second start time point are start time points included in different time point pairs of the target time point pairs.

In an implementation of the present application, after determining the target time point pair, the server can determine whether there are the start time point and the end time point which have an overlapped time range with each other. If so, that is, there are the first start time point and the second start time point which satisfy that the first start time point is earlier than the second start time point, the end time point corresponding to the first start time point is earlier than the end time point corresponding to the second start time point, and the second start time point is earlier than the end time point corresponding to the first start time point, in the target time point pairs, the end time point corresponding to the first start time point can be replaced with the end time point corresponding to the second start time point, and the second start time point and the end time point corresponding to the second start time point can be deleted. As such, the first start time point and the end time point corresponding to the first start time point, and the second start time point and the end time point corresponding to the second start time point become the first start time point and the end time point corresponding to the second start time point, that is, the end time point corresponding to the first start time point is replaced with the end time point corresponding to the second start time point. In this way, when the video clips are subsequently obtained, the video clips with duplicate content will be merged into one video clip.

For example, the first start time point is at the 23th second of the 10th minute (10'23"), the end time point corresponding to the first start time point is at the 33th second of the 10th minute (10'33"), the second start time point is at the 25th second of the 10th minute (10'25"), and the end time point corresponding to the second start time point is at the 35th second of the 10th minute (10'35"). Finally, the first start time point is at the 23th second of the 10th minute (10'23"), and the end time point corresponding to the first start time point is at the 35th second of the 10th minute (10'35").

In an implementation of the present application, in order to ensure that the determined target video clips do not have duplicate content, the following processing may also be performed after the 103.

If the start time point of a first video clip in target video clips is earlier than the start time point of a second video clip in the target video clips, the end time point of the first video clip is earlier than the end time point of the second video clip, and the start time point of the second video clip is earlier than the end time point of the first video clip, the first video clip and the second video clip are merged.

The first video clip is any video clip other than the second video clip in the target video clips, and the second video clip is any video clip other than the first video clip in the target video clips.

That is, the first video clip and the second video clip are different video clips in the target video clips.

In an implementation of the present application, after determining the target video clips, the server can determine whether any two of the video clips have an overlapped part. If so, that is, there are the first video clip and the second video clip which satisfy that: the start time of the first video clip is earlier than the start time of the second video clip, the end time of the first video clip is earlier than the end time point of the second video clip, and the start time of the second video clip is earlier than the end time of the first video clip, the server can merge the first video clip and the second video clip, so that the video clips with duplicate content are merged into one video clip.

For example, the first video clip is a video clip from the 30th second of the 10th minute (10'30") to the 40th second of the 10th minute (10'40"), the second video clip is a video clip from the 35th second of the 10th minute (10'35") to the 45th second of the 10th minute (10'45"), then the merged video clip is the video clip from the 30th second of the 10th minute (10'30") to the 45th second of the 10th minute (10'45").

In an implementation of the present application, in order to make the target video clips more likely to include the wonderful content, the target video clips can be screened based on the interaction information, and the following processing may be performed after the 103.

If the amount of gift resources in the target video clip exceeds a fifth preset threshold, the target video clip is retained, if the amount of comment information of the target video clip exceeds a sixth preset threshold, the target video clip is retained, or if the amount of like information of the target video clip exceeds a seventh preset threshold, the target video clip is retained.

The fifth preset threshold, the sixth preset threshold, and the seventh preset threshold can all be preset and stored in the server.

In an implementation of the present application, after obtaining the target video clip, the server can determine the amount of gift resources in the target video clip, and the method for determining the amount of the gift resources in the target video clip is the same as that for determining the amount of gift resources in the first time period, which will not be repeated here. It is determined whether the amount of the gift resources exceeds the fifth preset threshold, and if so, the target video clip is retained, otherwise, it indicates that the target video clip may not contain wonderful content and thus can be deleted.

Alternatively, after obtaining the target video clip, the server can determine the amount of the comment information of the target video clip, and the method for determining the amount of the comment information of the target video clip is the same as that for determining the amount of the comment information in the first time period, which will not be repeated here. It is determined whether the amount of the comment information exceeds the sixth preset threshold, and if so, the target video clip is retained, otherwise, it indicates that the target video clip may not contain wonderful content and thus can be deleted.

Alternatively, after obtaining the target video clip, the server can determine the amount of the like information of the target video clip, and the method for determining the amount of the like information of the target video clip is the same as that for determining the amount of the like information in the first time period, which will not be repeated here. It is determined whether the amount of the like information exceeds the seventh preset threshold, and if so, the target video clip is retained, otherwise, it indicates that the target video clip may not contain wonderful content and thus can be deleted.

In this way, the obtained video clips can be further screened by the interaction information, so that the probability for the intercepted video clips to include the wonderful content can be increased.

In an implementation of the present application, the number of the target video clips determined in the 103 may be relatively large. In response to determining that the number of the target video clips exceeds a preset number, the following filtering processing may be performed, and the corresponding processing may include the following.

The determined target video clips are sorted in a descending order of the amount of the gift resources, the preset number of top target videos clips are obtained and determined as the final video clips. Alternatively, the determined target video clips are sorted in the descending order of the amount of the comment information, and the preset number of top target video clips are obtained and determined as the final video clips. Alternatively, the determined target video clips are sorted in the descending order of the amount of the like information, and the preset number of top target video clips are obtained and determined as the final video clips.

The preset number may be a number which is set in advance and is used for indicating the number of video clips that are finally fed back to the terminal.

In an implementation of the present application, after obtaining the target video clip, the server can determine the amount of the gift resources in the target video clip, and the method for determining the amount of the gift resources in the target video clip is the same as that for determining the amount of gift resources in the first time period, which will not be repeated here. The target video clips are sorted in the descending order of the amount of the gift resources, the preset number of top target videos clips are obtained and determined as the final video clips.

Alternatively, after obtaining the target video clip, the server can determine the amount of comment information of the target video clip, and the method for determining the amount of the comment information of the target video clip is the same as that for determining the amount of the comment information in the first time period, which will not be repeated here. The target video clips are sorted in the descending order of the amount of the comment information, and the preset number of top target video clips are obtained and determined as the final video clips.

Alternatively, after obtaining the target video clip, the server can determine the amount of the like information of the target video clip, and the method for determining the amount of the like information of the target video clip is the same as that for determining the amount of the like information in the first time period, which will not be repeated here. The determined target video clips are sorted in the descending order of the amount of the like information, and the preset number of top target video clips are obtained and determined as the final video clips.

In addition, in this process, the various interaction information can also be combined and weighted. For example, after the amount of the like information, the amount of the comment information, and the amount of the gift resources are weighted, the target video clips are sorted in the descending order of the weighted values, and the preset number of top target video clips are obtained and determined as the video clips of the terminal.

It should be noted that determining the amount of the gift resources, the comment information, and the like information of the video clip can be understood as determining the amount of the gift resources, the comment information, and the like information during a live streaming time period corresponding to the video clip.

In the implementation of the present application, in response to obtaining the video clip from the live streaming video data of the performance live streaming room, the target time point pair of the live streaming video data are determined by using the audio data of the live streaming video data and the audio data of the original performer; and the target video clip is obtained based on the start time point and the end time point in the target time point pair. Since the server directly performs the video interception based on the audio data of the live streaming video data and the audio data of the original performer to obtain the video clip without manually operating the recording button, there will be no time interval between the start of the wonderful content and the start of recording the video data displayed on the screen, and thus the intercepted video clips are relatively complete.

Figure 4:
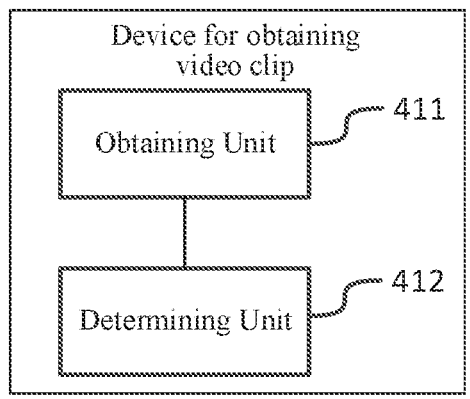
FIG. 4 is a structural block diagram showing a device for obtaining a video clip according to an example implementation.

FIG. 4 is a block diagram showing a device for obtaining a video clip based on an example implementation. Referring to FIG. 4, the device includes an obtaining unit 411 and a determining unit 412.

The obtaining unit 411 is configured to obtain live streaming video data in a performance live streaming room.

The determining unit 412 is configured to determine a target time point pair of the live streaming video data based on audio data of the live streaming video data and audio data of an original performer, where the target time point pair includes a start time point and an end time point.

The obtaining unit 411 is further configured to obtain a target video clip from the live streaming video data based on the target time point pair.

Optionally, the determining unit 412 is configured to: determine a first time point in the live streaming video data based on the audio data of the live streaming video data and the audio data of the original performer; and
determine the target time point pair corresponding to the first time point centered at the first time point based on a preset interception time duration.

Optionally, the audio data of the live streaming video data is the audio data of a song sung by a host, and the audio data of the original performer is the audio data of the song sung by the original singer. The determining unit 412 is configured to:
perform voice recognition on the audio data of the live streaming video data to obtain lyrics of the song; obtain the audio data of the song sung by the original singer based on the lyrics; for each sentence of the lyrics, determine a similarity between audio features of the audio data of the song sung by the original singer and audio features of the audio data of the live streaming video data, as a lyric similarity; and determine a time point of the audio data of the live streaming video data corresponding to a position in the lyrics with a highest lyric similarity above a first preset threshold, as the first time point of the live streaming video data.

Optionally, the determining unit 412 is further configured to determine a second time point in the live streaming video data based on interaction information of accounts other than a host account of the live streaming video data.

The determining unit 412 is configured to:
if a target time point in the first time points belongs to the second time point, retain the target time point, and if the target time point in the first time points does not belong to the second time point, delete the target time point; and
determine the target time point pair corresponding to the retained first time point based on the preset interception time duration by taking the retained first time point as a center.

Optionally, the determining unit 412 is further configured to:
if the amount of gift resources of the live streaming video data in a first time period exceeds a second preset threshold, determine a middle time point or an end time point of the first time period as the second time point in the live streaming video data; if the amount of comment information of the live streaming video data in a second time period exceeds a third preset threshold, determine the middle time point or the end time point of the second time period as the second time point in the live streaming video data; and/or;
if the number of likes of the live streaming video data in a third time period exceeds a fourth preset threshold, determine the middle time point or the end time point of the third time period as the second time point in the live streaming video data.

Optionally, the determining unit 412 is further configured to:
perform gift image recognition on images in the live streaming video data for the first time period to obtain the number of recognized gift images; and
determine the amount of the gift resources in the first time period based on the number of the gift images.

Optionally, the determining unit 412 is further configured to:
if in the target time point pairs, a first start time point is earlier than a second start time point, an end time point corresponding to the first start time point is earlier than an end time corresponding to the second start time point, and the second start time point is earlier than the end time point corresponding to the first start time point, replace the end time point corresponding to the first start time point with the end time point corresponding to the second start time point, and delete the second start time point and the end time point corresponding to the second start time point in the target time point pairs. The first start time point and the second start time point are start time points included in different time point pairs in the target time point pairs.

Optionally, the determining unit 412 is further configured to generate link information of the target video clip.

Figure 5:
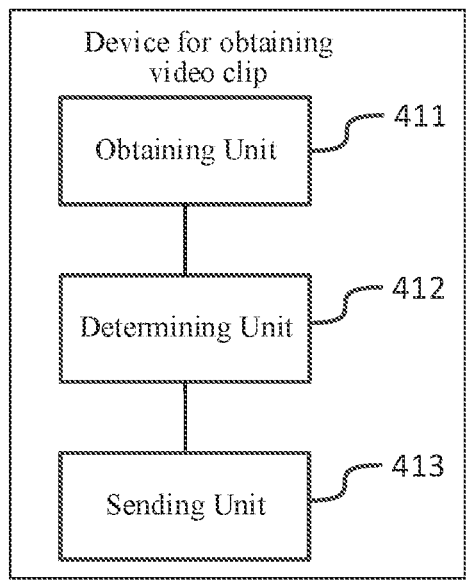
FIG. 5 is a structural block diagram showing a device for obtaining a video clip according to an example implementation.

As shown in FIG. 5, the device further includes:
a sending unit 413 configured to send the link information to login terminals of other accounts than the host account in the performance live streaming room to enable the login terminals of the other accounts to display the link information on a playback interface of the performance live streaming room, or to display the link information on a live streaming end interface of the performance live streaming room.

Optionally, the obtaining unit 411 is further configured to:
if the amount of the gift resources of the target video clip exceeds a fifth preset threshold, retain the target video clip;
if the amount of the comment information of the target video clip exceeds a sixth preset threshold, retain the target video clip; or,
if the amount of the like information of the target video clip exceeds a seventh preset threshold, retain the target video clip.

In the implementation of the present application, in response to obtaining the video clips from the live streaming video data of the performance live streaming room, the target time point pairs of the live streaming video data are determined by using the audio data of the live streaming video data and the audio data of the original performer; and the target video clips are obtained based on the start time points and the end time points in the target time point pairs. Since the server directly performs the video interception based on the audio data of the live streaming video data and the audio data of the original performer to obtain the video clips without manually operating the recording button, there will be no time interval between the start of the wonderful content and the start of recording the video data displayed on the screen, and thus the intercepted video clips are relatively complete.

Regarding the device in the foregoing implementations, specific manners for the units to perform operations have been described in detail in the implementations of the related methods, and will not be detailed here.

Figure 6:
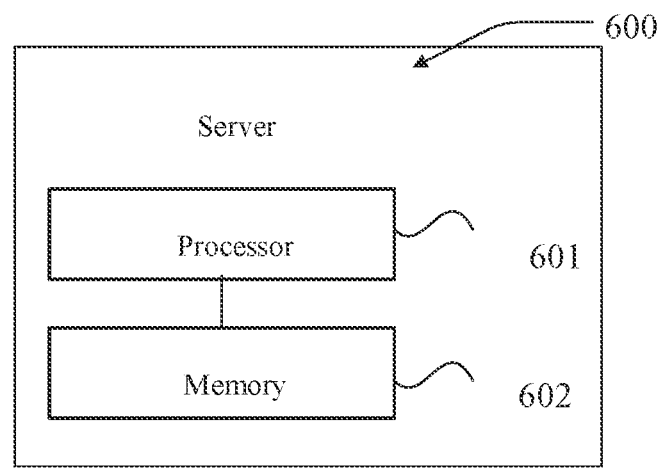
FIG. 6 is a structural block diagram showing a server according to an example implementation.

FIG. 6 is a schematic structural diagram of a server provided by an implementation of the present application. The server 600 may have relatively large changes due to different configurations or performance, and may include one or more central processing units (CPUs) 601 and one or more memories 602 which store at least one piece of instructions, and the at least one piece of instructions is loaded and executed by the processor 601 to carry out the operations of the method for obtaining the video clip.

In an implementation of the present application, there is provided another server, including: a processor and a memory for storing instructions executable by the processor, and the processor is configured to perform the operations of the method for obtaining the video clip.

Figure 7:
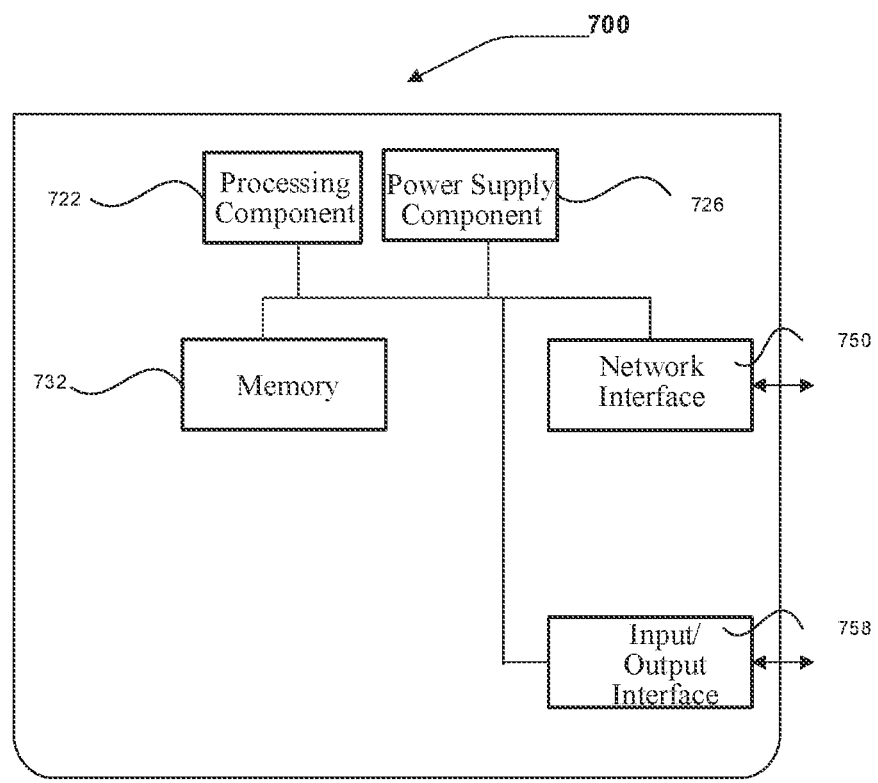
FIG. 7 is a structural block diagram showing another server according to an example implementation.

FIG. 7 is a block diagram showing a server 700 according to an example implementation. Referring to FIG. 7, the server 700 includes a processing component 722, which further includes one or more processors, and memory resources represented by a memory 732 for storing instructions that can be executed by the processing component 722, such as an application program. The application program stored in the memory 732 may include one or more modules each of which corresponds to a set of instructions. In addition, the processing component 722 is configured to execute the instructions to perform the operations of the method for obtaining the video clip.

The server 700 may also include a power supply component 726 configured to perform power management of the server 700, a wired or wireless network interface 750 configured to connect the server 700 to a network, and an input/output (I/O) interface 758. The server 700 can operate based on an operating system stored in the memory 732, such as Windows Server™, Mac OS X™, Unix™, Linux™, FreeBSD™ or similar operating systems.

In an implementation of the present application, there is also provided a device for obtaining a video clip, including: a processor and a memory for storing instructions executable by the processor, and the processor is configured to perform the operations of the method for obtaining the video clip.

In an implementation of the present application, there is provided a non-transitory computer-readable storage medium having stored therein instructions which, when being executed by a processor of a server, cause the server to perform the operations of the method for obtaining the video clip.

In the implementations of the present application, there is also provided an application program, including one or more instructions which can be executed by a processor of a server to carry out the operations of the method for obtaining the video clip.

Other implementations of the present disclosure will be apparent to those skilled in the art in consideration of the specification and practice of the present disclosure disclosed herein. The present application is intended to cover any variations, uses, or adaptations of the present disclosure, which follow the general principles of the present disclosure and include common general knowledge or conventional technical means in the art that are not disclosed in the present disclosure. The specification and implementations are merely illustrative, and a real scope and spirit of the present disclosure is defined by the appended claims.

It should be understood that the present disclosure is not limited to the precise structures described above and shown in the drawings, and various modifications and changes can be made without departing from the scope thereof. The scope of the present disclosure is limited only by the appended claims.

The above are only the preferred implementations of the present application and are not intended to limit the present application. Any modification, equivalent replacement, improvement, etc. made within the spirit and principle of the present application shall fall within the protection scope of the present application.

What is claimed is:

1. A method for obtaining a video clip, comprising:
   obtaining live streaming video data of a performance live streaming room;
   determining first time points of the live streaming video data based on a similarity between audio features of audio data of the live streaming video data and audio features of audio data of an original performer;
   determining target time point parameters corresponding to the first time points centered at the first time points based on a preset interception time duration, wherein each of the target time point parameters comprises a start time point and an end time point;
   replacing a first end time point parameters with a second end time point and deleting a second start time point and the second end time point in the target time point parameters in response to a first start time point being earlier than the second start time point, the first end time point being earlier than the second end time point, and the second start time point being earlier than the first end time point, wherein the first end time point corresponds to the first start time point, the second end time point corresponds to the second start time point, the first start time point and the second start time point are different and are comprised in the target time point parameters; and
   obtaining a target video clip from the live streaming video data based on the target time point parameters.

2. The method according to claim 1, wherein the audio data of the live streaming video data is audio data of a song sung by a host, and the audio data of the original performer is audio data of the song sung by the original singer;
   said determining the first time points of the live streaming video data comprises:
   obtaining lyrics of the song by performing voice recognition on the audio data of the live streaming video data;
   obtaining the audio data of the song sung by the original singer based on the lyrics;
   determining a lyric similarity between audio features of the audio data of the song sung by the original singer and audio features of the audio data of the live streaming video data for each sentence of the lyrics; and
   determining a time point corresponding to a position in the lyrics with a highest lyric similarity above a first threshold, as the first time point of the live streaming video data.

3. The method according to claim 1, further comprising:
   determining second time points of the live streaming video data based on interaction information of accounts other than a host account of the live streaming video data;
   wherein said determining the target time point parameters corresponding to the first time points centered at the first time points based on the preset interception time duration comprises:
   determining a time point of the first time points as a target time point in response to determination that the time point belongs to the second time points, and deleting the time point in response to determination that the time point does not belong to the second time points; and
   determining the target time point parameter corresponding to the target time point centered at the target time point based on the preset interception time duration.

4. The method according to claim 3, wherein said determining the second time points in the live streaming video data based on interaction information of accounts other than a host account of the live streaming video data comprises:
   determining a middle time point or an end time point of a first time period as the second time point of the live streaming video data in response to an amount of gift resources of the live streaming video data in the first time period exceeding a second threshold;
   determining a middle time point or an end time point of a second time period as the second time point of the live streaming video data in response to an amount of comment information of the live streaming video data in the second time period exceeding a third threshold; or,
   determining a middle time point or an end time point of a third time period as the second time point of the live streaming video data in response to the number of likes of the live streaming video data in the third time period exceeding a fourth threshold.

5. The method according to claim 4, further comprising:
obtaining the number of each type of recognized gift images by recognizing gift images in the live streaming video data for the first time period; and
determining the amount of the gift resources in the first time period based on the number of each type of gift images.

6. The method according to claim 1, further comprising:
generating link information of the target video clip; and
sending the link information to login terminals for displaying the link information on a playback interface or a live streaming end interface of the performance live streaming room, wherein the login terminals is logged in by the accounts other than a host account in the performance live streaming room.

7. The method according to claim 1, further comprising:
retaining the target video clip in response to the amount of gift resources of the target video clip exceeding a fifth threshold;
retaining the target video clip in response to the amount of comment information of the target video clip exceeding a sixth threshold; or,
retaining the target video clip in response to the amount of like information of the target video clip exceeding a seventh threshold.

8. A device for obtaining a video clip, comprising:
a processor; and
a memory for storing instructions executable by the processor;
wherein, the processor is configured to perform operations comprising:
obtaining live streaming video data of a performance live streaming room;
determining first time points of the live streaming video data based on a similarity between audio features of audio data of the live streaming video data and audio features of audio data of an original performer;
determining target time point pairs corresponding to the first time points centered at the first time points based on a preset interception time duration, wherein each of the target time point pairs comprises a start time point and an end time point;
replacing a first end time point parameters with a second end time point and deleting a second start time point and the second end time point in the target time point parameters in response to a first start time point being earlier than the second start time point, the first end time point being earlier than the second end time point, and the second start time point being earlier than the first end time point, wherein the first end time point corresponds to the first start time point, the second end time point corresponds to the second start time point, the first start time point and the second start time point are different and are comprised in the target time point parameters; and
obtaining a target video clip from the live streaming video data based on the target time point pairs.

9. The device according to claim 8, wherein the audio data of the live streaming video data is audio data of a song sung by a host, and the audio data of the original performer is audio data of the song sung by the original singer, and
wherein said determining the first time points in the live streaming video data based on the similarly between the audio features of the audio data of the live streaming video data and the audio features of the audio data of the original performer comprises:
obtaining lyrics of the song by performing voice recognition on the audio data of the live streaming video data;
obtaining the audio data of the song sung by the original singer according to the lyrics;
determining a similarity between audio features of the audio data of the song sung by the original singer and audio features of the audio data of the live streaming video data for each sentence of the lyrics, as a lyric similarity; and
determining a time point corresponding to a position in the lyrics with a highest lyric similarity above a first threshold, as the first time point of the live streaming video data.

10. The device according to claim 8, wherein the operations further comprise:
determining second time points in the live streaming video data based on interaction information of accounts other than a host account of the live streaming video data, and
wherein said determining the target time point pairs corresponding to the first time points centered at the first time points based on the preset interception time duration comprises:
retaining a time point of the first time points as a target time point in response to determination that the time point belongs to the second time points, and deleting the time point in response to determination that the time point does not belong to the second time points; and
determining the target time point pair corresponding to the retained target time point centered at the retained target time point based on the preset interception time duration.

11. The device according to claim 10, wherein said determining the second time points in the live streaming video data based on the interaction information of accounts other than the host account of the live streaming video data comprises:
determining a middle time point or an end time point of a first time period as the second time point of the live streaming video data in response to an amount of gift resources of the live streaming video data in the first time period exceeding a second threshold;
determining a middle time point or an end time point of a second time period as the second time point of the live streaming video data in response to an amount of comment information of the live streaming video data in the second time period exceeding a third threshold; or,
determining a middle time point or an end time point of a third time period as the second time point of the live streaming video data in response to the number of likes of the live streaming video data in a third time period exceeding a fourth threshold.

12. The device according to claim 11, wherein the operations further comprise:
obtaining the number of each type of recognized gift images by recognizing gift images in the live streaming video data for the first time period; and
determining the amount of the gift resources in the first time period based on the number of the gift images.

13. The device according to claim 8, wherein the operations further comprise:
generating link information of the target video clip; and sending the link information to login terminals of other accounts than a host account in the performance live streaming room for displaying the link information on a playback interface or a live streaming end interface of the performance live streaming room of the login terminals of other accounts.

14. The device according to claim 8, wherein the operations further comprise:
retaining the target video clip in response to an amount of gift resources of the target video clip exceeding a fifth threshold;
retaining the target video clip in response to an amount of comment information of the target video clip exceeding a sixth threshold; or,
retaining the target video clip in response to an amount of like information of the target video clip exceeding a seventh threshold.

15. A non-transitory computer-readable storage medium having stored therein instructions which, when being executed by a processor of a server, cause the server to perform operations comprising:
obtaining live streaming video data of a performance live streaming room;
determining first time points of the live streaming video data based on a similarity between audio features of audio data of the live streaming video data and audio features of audio data of an original performer;
determining target time point parameters corresponding to the first time points centered at the first time points based on a preset interception time duration, wherein each of the target time point parameters comprises a start time point and an end time point;
replacing a first end time point parameters with a second end time point and deleting a second start time point and the second end time point in the target time point parameters in response to a first start time point being earlier than the second start time point, the first end time point being earlier than the second end time point, and the second start time point being earlier than the first end time point, wherein the first end time point corresponds to the first start time point, the second end time point corresponds to the second start time point, the first start time point and the second start time point are different and are comprised in the target time point parameters; and
obtaining a target video clip from the live streaming video data based on the target time point parameters.

16. The storage medium according to claim 15, wherein the audio data of the live streaming video data is audio data of a song sung by a host, and the audio data of the original performer is audio data of the song sung by the original singer;
said determining the first time points of the live streaming video data comprises:
obtaining lyrics of the song by performing voice recognition on the audio data of the live streaming video data;
obtaining the audio data of the song sung by the original singer based on the lyrics;
determining a lyric similarity between audio features of the audio data of the song sung by the original singer and audio features of the audio data of the live streaming video data for each sentence of the lyrics; and
determining a time point corresponding to a position in the lyrics with a highest lyric similarity above a first threshold, as the first time point of the live streaming video data.

17. The storage medium according to claim 15, the operations further comprises:
determining second time points of the live streaming video data based on interaction information of accounts other than a host account of the live streaming video data;
wherein said determining the target time point parameters corresponding to the first time points centered at the first time points based on the preset interception time duration comprises:
determining a time point of the first time points as a target time point in response to determination that the time point belongs to the second time points, and deleting the time point in response to determination that the time point does not belong to the second time points; and
determining the target time point parameter corresponding to the target time point centered at the target time point based on the preset interception time duration.

18. The storage medium according to claim 17, wherein said determining the second time points in the live streaming video data based on interaction information of accounts other than a host account of the live streaming video data comprises:
determining a middle time point or an end time point of a first time period as the second time point of the live streaming video data in response to an amount of gift resources of the live streaming video data in the first time period exceeding a second threshold;
determining a middle time point or an end time point of a second time period as the second time point of the live streaming video data in response to an amount of comment information of the live streaming video data in the second time period exceeding a third threshold; or,
determining a middle time point or an end time point of a third time period as the second time point of the live streaming video data in response to the number of likes of the live streaming video data in the third time period exceeding a fourth threshold.

* * * * *